United States Patent

Hsiue et al.

[11] Patent Number: 6,132,688
[45] Date of Patent: Oct. 17, 2000

[54] METHOD AND APPARATUS FOR TREATING EXHAUST GAS FROM A SEMICONDUCTOR FABRICATION MACHINE

[75] Inventors: J. S. Hsiue; B. H. Yang, both of Hsin-Chu; T. J. Fang; J. J. Wang, both of Hsin-Chu Hsien; W. C. Lee, Taipei Hsien; T. D. Chang, Chang Hua Hsien; C. S. Chung; W. F. Chuang, both of Hsin-chu, all of Taiwan

[73] Assignee: Taiwan Semiconductor Manufacturing Company, Ltd., Hsin Chu, Taiwan

[21] Appl. No.: 09/073,580

[22] Filed: May 6, 1998

[51] Int. Cl.$^7$ .................. B01D 53/34; B01J 8/00
[52] U.S. Cl. .............. 422/173; 422/169; 422/170; 422/171
[58] Field of Search ............ 422/171, 168–170, 422/173; 202/186, 202; 203/41, 87

[56] References Cited

U.S. PATENT DOCUMENTS 3,634,201  1/1972  Kehse ............................. 203/87
3,884,768  5/1975  Griffith ............................ 203/87
4,940,134  7/1990  Aoki et al. ...................... 202/187

*Primary Examiner*—Hien Tran
*Attorney, Agent, or Firm*—Tung & Associates

[57] ABSTRACT

A method and apparatus for treating exhaust gas from a semiconductor fabrication machine by utilizing a dual-stage apparatus are disclosed. The dual-stage apparatus utilizes a first stage treatment of a condensation unit for removing high boiling temperature contents in the exhaust gas and a second stage treatment in fluid communication with the first stage treatment of an absorption unit for removing low boiling temperature contents in the exhaust gas or contents that were not previously removed in the first stage treatment. The condensation unit can be operated efficiently at a temperature range between about 5° C. and about 15° C., while the partially-treated exhaust gas exiting the condensation unit can be pre-heated to a temperature between about 20° C. and about 40° C. prior to entering the absorption unit for removal of the low boiling temperature contents.

7 Claims, 1 Drawing Sheet

METHOD AND APPARATUS FOR TREATING EXHAUST GAS FROM A SEMICONDUCTOR FABRICATION MACHINE

FIELD OF THE INVENTION

The present invention generally relates to a method and apparatus for treating exhaust gas and more particularly, relates to a method and apparatus for treating exhaust gas from a semiconductor fabrication machine by a dual-stage apparatus wherein a first stage treatment is carried out by a condensation method and a second stage treatment is carried out by an absorption method.

BACKGROUND OF THE INVENTION

In semiconductor fabrication processes, effluent or exhaust gas from a process chamber must be treated chemically or physically before they can be released into a factory exhaust system and subsequently into the atmosphere. A large number of reactant gases utilized in the semiconductor fabrication processes and their reaction products are either highly flammable, toxic or foul-smelling. Some of the spent reactant gases exhausted out of a process chamber may contain gases that have not been reacted or have been partially reacted and therefore must be chemically treated before they can be released into the atmosphere. Gas treatment units such as gas reactor columns are frequently used for such purpose of converting toxic gases into non-toxic gases.

While a gas reactor column can be a hot bed reactor that treats a wide variety of gases in a single cartridge without creating additional effluent disposal problems, a simpler method of treating exhaust gases is the use of an absorption unit that functions on the principle of gas absorption into a porous substance without chemical reactions taken place. This type of physical absorption process can be carried out by using a bed of porous substance such as activated carbon for absorbing certain components in exhaust gases. Specifically, those of low boiling temperature and of foul-smelling.

For instance, in the exhaust gas exiting a photoresist stripper chamber, various toxic and foul-smelling gases are present. Typically, a photoresist liquid of ACT®-690 is used in a photoresist stripper chamber. Various high boiling temperature gases such as dimethyl sulfoxide (DMSO, $C_2H_6SO$), N-methyl pyrolidone (NMP, $C_2H_9NO$), methyl ethyl alcohol (MEA, $C_2H_7NO$) and various foul-smelling gases such as dimethyl sulfide ($C_2H_6S$), dimethyl disulfide ($CH_6S_2$) and residual solvents such as isopropyl alcohol (IPA) and acetone are present in the exhaust gas. While the low boiling temperature gases, i.e., those having a boiling temperature of less than 100° C. such as dimethyl sulfide, dimethyl disulfide, IPA and acetone can be successfully removed by an absorption apparatus filled with activated carbon as the absorption substance, the high boiling temperature gases such as DMSO, NMP and MEA cannot be effectively removed in the absorption apparatus. The total percentage of toxic, high boiling temperature gases removed from the exhaust gas therefore is poor and unacceptable when the exhaust gas is only treated by an absorption apparatus.

The following examples 1 and 2 illustrate results of the photoresist stripper chamber exhaust gas being treated by a conventional method of absorption alone.

EXAMPLE 1

The exhaust gas from a photoresist stripper chamber is treated which contains 8–200 ppm dimethyl sulfoxide, 21–250 ppm 2-aminoethanol, 1–20 ppm N-methyl pyrolidone, 21 ppm ethylene glycol, 0.5–10 ppm dithiolethylene glycol, 0.5–3 ppm dimethyl sulfide and 20–150 ppm isopropyl alcohol.

The flow rate of the exhaust gas exiting the chamber is 2,000–4,000 $m^3$/hr which is kept at a temperature of about 45° C. The exhaust gas is first cooled by a coil-type cooling apparatus to approximately 14° C., and then fed directly into an absorption apparatus which contains activated carbon. The exhaust gas exiting the absorption apparatus was analyzed to show a removal efficiency of 70.1–78.3% at an energy usage rate of 72,000 k cal/hr. The efficiency is therefore not satisfactory and allows toxic components in the exhaust gas to escape to the atmosphere.

EXAMPLE 2

The content of the exhaust gas is similar to that shown in Example 1. The exhaust gas is directly fed to an absorption apparatus containing activated carbon for an absorption treatment. The exhaust gas exiting the absorption apparatus was determined at a removal efficiency of about 65.3–80.0%. However, foul-smell was detected after the absorption apparatus was used only for 3 days, and the activated carbon had to be replaced after 7 days due to excessive condensation in the carbon.

It is therefore an object of the present invention to provide a method and apparatus for treating an exhaust gas from a semiconductor fabrication machine that does not have the drawbacks or shortcomings of conventional method and apparatus.

It is another object of the present invention to provide a dual-stage apparatus for treating an exhaust gas from a semiconductor fabrication machine when the gas contains both high boiling temperature and low boiling temperature components.

It is a further object of the present invention to provide a dual-stage apparatus for treating an exhaust gas from a semiconductor fabrication machine wherein the apparatus includes a first stage treatment apparatus of a condensing unit and a second stage treatment apparatus of an absorption apparatus unit.

It is another further object of the present invention to provide a dual-stage apparatus for treating an exhaust gas from a semiconductor fabrication machine by providing both a condensing unit for treating high boiling temperature gases and an absorption unit for treating low boiling temperature gases that are contained in the exhaust gas.

It is still another object of the present invention to provide a dual-stage apparatus for treating an exhaust gas from a semiconductor fabrication facility wherein a first stage treatment apparatus of a condensing unit is effective in removing high boiling temperature contents at a condensation temperature between about 5° C. and about 15° C.

It is yet another object of the present invention to provide a dual-stage apparatus for treating an exhaust gas from a semiconductor fabrication facility wherein a partially-treated exhaust gas outputted from a condensing unit is preheated prior to entering an absorption unit.

It is still another further object of the present invention to provide a method for removing high boiling temperature and low boiling temperature contents in an exhaust gas by first condensing the high boiling temperature contents in the exhaust gas and then absorbing the low boiling temperature contents in the partially-treated exhaust gas.

It is yet another further object of the present invention to provide a method for treating an exhaust gas from a semiconductor fabrication facility wherein high boiling temperature contents of the exhaust gas are removed by a condensation unit operated at a temperature between about 5° C. and about 15° C.

SUMMARY OF THE INVENTION

The present invention discloses a dual-stage apparatus for treating an exhaust gas from a semiconductor fabrication machine or facility by utilizing a first stage treatment including a condensing unit and a second stage treatment including an absorption unit such that both high boiling temperature contents and low boiling temperature contents of the exhaust gas can be substantially removed from the exhaust gas. The present invention is further directed to a method of utilizing such dual-stage apparatus for treating an exhaust gas from a semiconductor fabrication machine or facility.

In a preferred embodiment, a dual-stage apparatus for treating an exhaust gas from a semiconductor fabrication facility is provided which includes a first stage treatment apparatus of a condensing unit adapted for removing high boiling temperature contents in the exhaust gas, and a second stage treatment apparatus in fluid communication with the first stage treatment apparatus of an absorption unit adapted for removing contents in the exhaust gas that were not previously removed by the first stage treatment apparatus. The second stage treatment apparatus is adapted for removing low boiling temperature contents in the exhaust gas. The first stage treatment apparatus is adapted for removing high boiling temperature contents at a condensation temperature between about 5° C. and about 15° C. The apparatus further includes a heating apparatus in fluid communication and connected in-between the first and the second stage treatment apparatus for raising the temperature of the exhaust to at least 20° C., and preferably to at least 25° C. The exhaust gas may be fed from a photoresist stripper chamber which contains dimethyl sulfoxide, N-methyl pyrolidone, dimethyl sulfide, isopropyl alcohol, etc. The absorption unit of the second stage treatment apparatus may include activated carbon particles adapted for removing low boiling temperature contents. The dual-stage treatment apparatus may further include a heat exchanger connected in fluid communication with and prior to the first stage treatment apparatus adapted for taking heat away from the exhaust gas.

In another preferred embodiment, an exhaust gas treatment apparatus is provided which includes a first exhaust gas feed pipe that has an inlet connected to an exhaust gas source and an outlet connected to a condensing unit, a condensing unit adapted for accepting an exhaust gas from the exhaust gas feed pipe and for condensing high boiling temperature contents in the exhaust gas, a second exhaust gas feed pipe that has an inlet connected to an outlet on the condensing unit and an outlet connected to an absorption unit, and an absorption unit adapted for accepting a pre-treated exhaust gas from the second exhaust gas feed pipe and for absorbing low boiling temperature contents in the exhaust gas. The exhaust gas treatment apparatus may further include a first heat exchanger for extracting heat from an exhaust gas and thus decreasing the temperature of an incoming exhaust gas prior to entering the condensing unit. The second feed pipe may further include a second heat exchanger for pre-heating the exhaust gas and thus increasing a temperature of the partially-treated exhaust gas prior to entering the absorption unit. The absorption unit may advantageously utilize activated carbon as the absorption material. The condensing unit may further include a condensed liquid collection tank and a pump means for removing the condensed liquid. The condensing unit is effective in removing high boiling temperature contents in the exhaust gas at a temperature range of between about 5° C. and about 15° C.

The present invention is further directed to a method for removing high boiling temperature and low boiling temperature contents in an exhaust gas which can be carried out by the operating steps of flowing an exhaust gas that has high boiling temperature and low boiling temperature contents into a condensing unit, condensing the high boiling temperature contents in the exhaust gas and thus separating the contents from the exhaust gas and outputting a partially-treated exhaust gas, flowing the partially-treated exhaust gas that has low boiling temperature contents into an absorption unit, and absorbing low boiling temperature contents in the partially-treated exhaust gas thus separating the contents from the partially-treated exhaust gas and outputting a treated exhaust gas substantially without the high boiling temperature and the low boiling temperature contents.

The method may further include the step of operating the condensing unit at a condensation temperature between about 5° C. and about 15° C. The method may further include the step of removing partially heat from the exhaust gas prior to flowing the exhaust gas into the condensing unit. The method may further include the step of heating the partially-treated exhaust gas to a temperature of at least 20° C. prior to flowing the partially-treated exhaust gas into the absorption unit. The method may still further include the step of absorbing the low boiling temperature contents in the partially-treated exhaust gas by activated carbon.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

Figure 1:
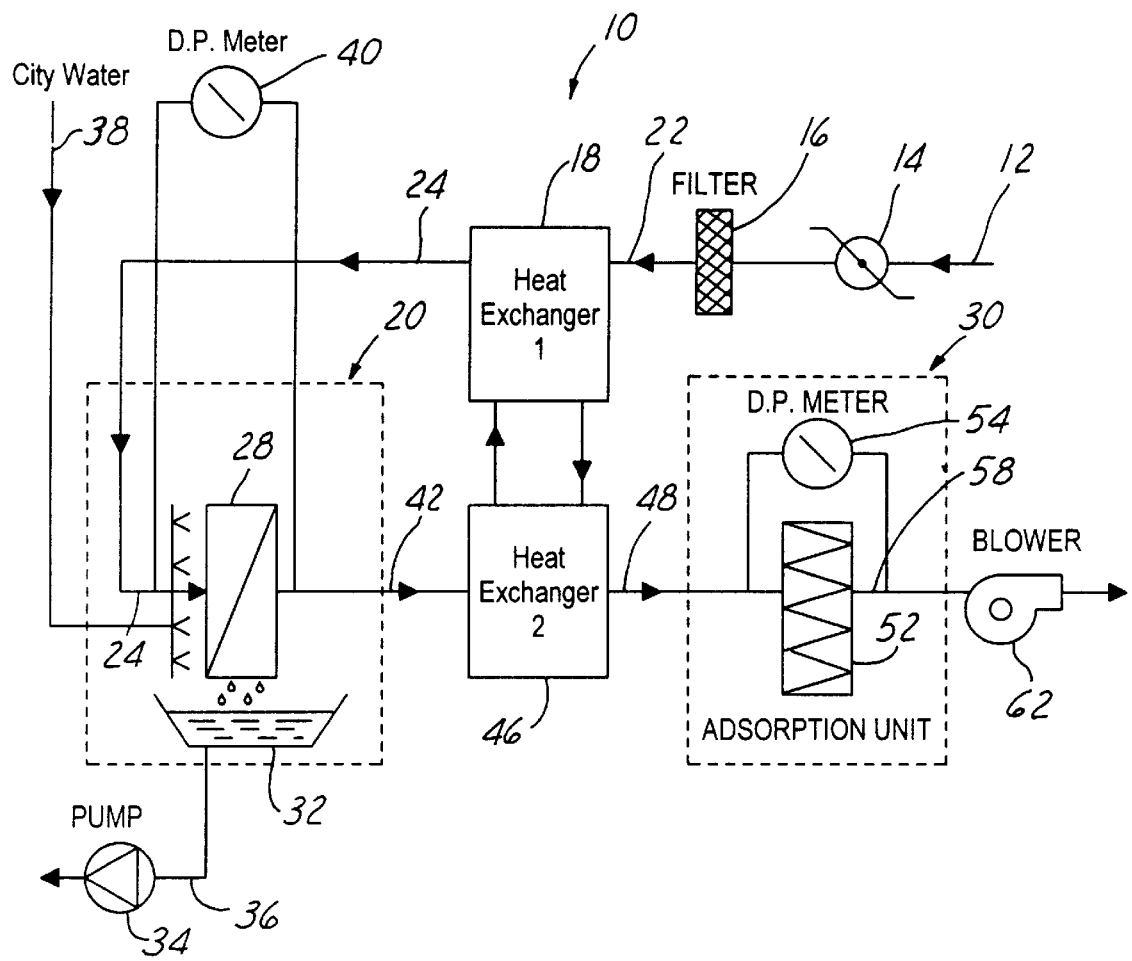
FIG. 1 is a schematic illustrating the present invention dual-stage apparatus for treating an exhaust gas from a semiconductor fabrication machine.

The present invention discloses a novel dual-stage apparatus for treating an exhaust gas from a semiconductor fabrication machine, and is particularly suitable for treating exhaust gas from a photoresist stripper apparatus. The apparatus is effective in removing both high boiling temperature contents and low boiling temperature contents in an exhaust gas. The present invention is further directed to a method for utilizing such dual-stage apparatus for treating an exhaust gas from a semiconductor fabrication machine.

To illustrate the present invention method and apparatus, exhaust gas from a photoresist stripper chamber is used as an example. It is known that, in an exhaust gas from a photoresist stripper chamber that utilizes a photoresist stripper of the type of ACT®-690, high boiling temperature contents, low boiling temperature contents and residual solvents are present. In an ACT®-690 photoresist stripper, there are 25% dimethyl sulfoxide ($C_2H_6OS$), 70% monothanolamine ($C_2H_7NO$) and 5% inhibitor. The major contents of the exhaust gas from a photoresist stripper chamber is shown in Table 1.

TABLE 1

| Gas | Formula | Molecular Wt. | Boiling Temp. °C. | Gravity, g/ml |
|---|---|---|---|---|
| IPA | $C_3H_8O$ | 60.09 | 88.23 | 0.786 (@20° C.) |
| Acetone | $C_3H_6O$ | 58.08 | 56.0 | 0.791 (@20° C.) |
| DMSO | $C_2H_6SO$ | 78.13 | 189.0 | 1.01 (@20° C.) |
| NMP | $C_5H_9NO$ | 99.13 | 202.0 | 1.027 (@20° C.) |
| MEA | $C_2H_7NO$ | 61.08 | 171.0 | 1.022 (@20° C.) |
| Dimethyl Sulfide | $C_2H_6S$ | 62.13 | 37.5 | — |
| Dimethyl Disulfide | $C_2H_6S_2$ | 94.19 | 108 | — |

As shown in Table 1, the exhaust gas from a photoresist stripper chamber contains high boiling temperature components such as DMSO, NMP and MEA, low boiling temperature components of dimethyl sulfide and dimethyl disulfide, and residual solvents such as IPA and acetone.

The present invention novel method and apparatus utilizes both condensation and absorption methods such that a photoresist stripper exhaust gas can be successfully treated. By utilizing the condensation method, high boiling temperature contents in an exhaust gas such as DMSO and NMP can be removed. By utilizing the absorption method, other contents which are normally difficult to be condensed, i.e., including the low boiling temperature contents of $C_2H_6S$ and $C_2H_6S_2$, can be removed by an absorbing medium such as activated carbon or any other substance. Heat exchangers are utilized in the present invention novel apparatus to save energy and to utilize waste heat from an exhaust gas to preheat the gas prior to entering into an absorption apparatus. The present invention method therefore is effective in removing both toxic and foul-smelling components an exhaust gas from a photoresist stripper machine.

Referring initially to FIG. 1, wherein a present invention novel dual-stage apparatus for treating an exhaust gas from a semiconductor fabrication machine is shown. The dual-stage apparatus 10 consists of a condensation unit 20 and an absorption unit 30. Exhaust gas 12 from a semiconductor fabrication machine, for instance, from a photoresist stripper, is first fed into a heat exchanger 18 through a flow control valve 14 and a filter 16. The exhaust gas exiting a photoresist stripper machine is normally kept at about 45° C. when it enters the heat exchanger 18. The heat exchanger 18 removes partially the heat from the exhaust gas 22 and outputs a lower temperature exhaust gas 24, i.e., at approximately 31° C. The exhaust gas 24 is then fed into a condenser 28 which is part of the condensing unit 20. As shown in FIG. 1, the condensing unit 20 consists of a condenser 28, a liquid collection tank 32 and a pump 34. The liquid collection tank 32 collects the condensed liquid from condenser 28 through pipe 36 and then pumps it away by pump 34. A city water supply 38 can be used, either with refrigeration or without refrigeration, as the cooling water for condenser 28.

The effectiveness of the condensation unit 20 on removing gases from a photoresist stripper exhaust gas is shown in Table 2.

TABLE 2

| Compound | At Condenser Inlet | At Condenser Outlet | At Absorption Unit Outlet | Condensing Efficiency, % | Total Efficiency, % |
|---|---|---|---|---|---|
| DMSO ($C_2H_6SO$) | 8640 | 2493 | 30 | 71.1% | 99.7% |
| NMP ($C_5H_9NO$) | 450 | 118 | 4 | 73.8% | 99.1% |
| $C_2H_6S$ | 1596 | 1321 | 305 | 17.3% | 80.9% |
| $C_2H_6S_2$ | 802 | 539 | 32 | 32.8% | 96.0% |
| $C_2H_6SO_2$ | 32 | 22 | 2 | 31.3% | 93.8% |
| THC Removal | 24390 | 9349 | 758 | 61.7% | 96.9% |

As seen in Table 2, the high boiling temperature contents of the exhaust gas, i.e., DMSO and NMP are substantially removed in the condensing unit 20. For instance, the DMSO content is removed at a condensing efficiency of 71.1%, while the NMP content is removed at a condensing efficiency of 73.8%. These removal efficiencies are substantially higher than that achieved by conventional methods which do not utilize a condensing unit.

At the output end of the condensing unit 20, a partially-treated exhaust gas 42 exits and is fed into a second heat exchanger 46. In the second heat exchanger 46, heat transported from the first heat exchanger 18 is used to preheat exhaust gas 42 such that the low temperature output gas from the condensing unit 20, i.e., at about 14° C., can be heated to a temperature between about 20 and 40° C., shown as exhaust 48. The condenser 28 in the condensing unit normally operates at a temperature between about 5° C. and about 15° C., and preferably at between about 10° C. and about 14° C. A differential pressure meter 40 is utilized to monitor the input and output pressures to and from the condenser 28. The utilization of the heat exchangers 18 and 46 provides an energy saving feature for the present invention novel apparatus 10. The heat removed from the exhaust gas 22 is used to preheat the exhaust gas 42 such that the absorption process can be more efficiently carried out.

The exhaust gas 48 outputted from heat exchanger 46 is then fed into the absorption unit 30. The absorption unit 30 is constructed of an absorption bed 52 which contains a porous material such as activated carbon, or any other suitable porous material. The inlet and outlet pressures of the absorption bed 52 is monitored by a differential pressure meter 54. The monitoring of the differential pressure meter 52 is important such that it provides a reliable indication when the absorption medium, i.e., activated carbon needs to be replaced or replenished. The exhaust gas 58 exiting the absorption bed 52 is taken away by a blower 62 and fed into a factory exhaust system for releasing to the atmosphere.

As shown in Table 2, low boiling temperature components such as $C_2H_6S$, $C_2H_6S_2$ and $C_2H_6SO_2$ are substantially removed from the exhaust gas after the absorption process is conducted. For instance, while the $C_2H_6S$ gas has only a 17.3% removal efficiency after the condensation process, it is 80.9% removed after the absorption process. Similarly, while the $C_2H_6S_2$ gas is only 32.8% removed after the condensation process, it is 96.0% removed after the absorption process. Finally, while the $C_2H_6SO_2$ gas is only 31.3% removed after the condensation process, it is 93.8% removed after the absorption process. Also shown in Table 2, the total hydrocarbon (THC) removal achieved is 96.9% which exemplified the efficiency of the present invention novel method and apparatus. The efficiency of the present invention novel method is further exemplified in the following Examples 3 and 4.

EXAMPLE 3

In this Example, an exhaust gas having the same content as that shown in Example 1 from a photoresist stripper chamber is utilized. The exhaust gas is flown through a condenser unit at a flow rate of 2,000–4,000 m³/hr at an exhaust gas temperature of 45° C. The condenser unit has a dimension of 1,000 mm length and 700 mm height and is equipped with cooling fins. A heat exchanger having a dimension of 1,000 mm width and 1,600 mm length is connected in series between the condensing unit and the absorption unit for preheating the partially-treated exhaust gas prior to entering the absorption unit. The absorption unit is loaded with 500 kilogram of activated carbon in a fixed bed type absorption system for treating the low boiling temperature contents of the exhaust gas. An exhaust gas is first flown into a heat exchanger to drop the temperature of the exhaust gas from 45° C. to about 31° C. prior to entering the condenser unit which is set at a temperature of 14° C. After the high boiling temperature contents in the exhaust gas is condensed in the condenser unit, the partially-treated exhaust gas is heated up in a second heat exchanger to a temperature between about 20° C. and about 40° C. before it is flown into an absorption unit.

The treated exhaust gas exiting the absorption unit was analyzed and the following concentrations of gases were discovered. The treated exhaust gas contains 0.06–0.3 ppm of dimethyl sulfoxide, 0–15 ppm of 2-aminoethanol, 0.01–0.05 ppm of N-methyl pyrolidone, 0.02–0.2 ppm of dimethyl sulfide and less than 0.01 ppm of dithiolethylene glycol. The other components of the untreated exhaust gas were not detected. The removal efficiencies of the various gas components are therefore between 90.9%–99.8%. The energy consumption per unit time is approximately 54,000 k cal/hr. The activated carbon lasted three months before it was necessary for replacement.

EXAMPLE 4

An exhaust gas having the same composition as shown in Example 3 is used in this test. The exhaust gas is first treated in a condensation unit at 14° C., then heated in a heat exchanger to a temperature of about 35° C. before it is flown into an absorption unit containing activated carbon. The removal efficiencies for the various components in the exhaust gas is between about 90.2–98.9%. The energy consumption per unit time is about 88,000 k cal/hr.

EXAMPLE 5

In this Example, an exhaust gas containing 30–800 ppm isopropyl alcohol, 20–200 ppm N-pyrolidone, 2–10 ppm dimethyl sulfide, 4–15 ppm trimethyl silanol, 10–50 ppm of 2-propyl alcohol, 0–10 ppm benzene and 10–40 ppm propanoic acid is used. The exhaust gas is flown into a heat exchanger at a flow rate of 55,000 m³/hr at an exhaust gas temperature of about 45° C. After heat is taken away from the exhaust gas to bring its temperature down to about 29.5° C., the exhaust gas is fed into a condensing unit having its cooling coil set at 10° C. The dimensions of the cooling fins is about 3,600 mm in length and about 2,000 mm in height. After water and high boiling temperature substances are condensed in the condensation unit, the exhaust gas is flown into a fog removal unit to remove the fog and water droplets from the gas and then flown into a heat exchanger to raise its temperature to about 26° C. The partially-treated exhaust gas is then flown into a circular-shaped absorption unit having a diameter of 3,900 mm and a thickness of 400 mm with a honey-combed structure. The surface of the honey-combed structure is coated with a porous ceramic substance used as the absorption medium for absorbing low boiling temperature components in the exhaust gas. The resulting exhaust gas exiting the absorption unit is analyzed to obtain a removal efficiency of 97% (based on the total hydrocarbon removed). The foul smell is substantially removed from the exhaust gas. The exhaust gas is then flown into an oxidizing furnace to form carbon dioxide and water achieving a total removal efficiency of 99%.

The present invention novel method and apparatus have therefore been amply demonstrated by the above Examples and the appended drawing of FIG. 1. These examples illustrate that the present invention novel method can be used effectively in removing both the high boiling temperature contents and the low boiling temperature contents in an exhaust gas from a photoresist stripper chamber. The removal rate can be achieved at over 95% which compares most favorably with that of 30% achievable by a conventional removal system. The present invention novel apparatus further provides the benefit that the absorption medium utilized in the absorption unit can be used for a prolonged period of time before replacement is necessary. Furthermore, the present invention apparatus only occupies a small factory floor space for operation.

While the present invention has been described in an illustrative manner, it should be understood that the terminology used is intended to be in a nature of words of description rather than of limitation.

Furthermore, while the present invention has been described in terms of a preferred embodiment and an alternate embodiment, it is to be appreciated that those skilled in the art will readily apply these teachings to other possible variations of the inventions.

The embodiment of the invention in which an exclusive property or privilege is claimed are defined as follows:

What is claimed is:

1. A dual-stage apparatus for treating an exhaust gas from a semiconductor fabrication machine comprising:

a first stage treatment apparatus comprises a condensing unit for removing contents in said exhaust gas that have a boiling temperature higher than 150° C., a first heat exchanger means connected in fluid communication with and prior to said first stage treatment apparatus for extracting heat from said exhaust gas, a second stage treatment apparatus in fluid communication with said first stage treatment apparatus comprises an absorption unit for removing contents in said exhaust gas that were not removed by said first stage treatment apparatus, and a second heat exchange means in fluid communication and connected in-between said first and second stage treatment apparatus for raising the temperature of said exhaust gas from said first stage treatment apparatus by at least 20° C.

2. A dual-stage apparatus for treating an exhaust gas from a semiconductor fabrication machine according to claim 1, wherein said absorption unit removes contents in said exhaust gas that have a boiling temperature lower than 150° C.

3. A dual-stage apparatus for treating an exhaust gas from a semiconductor fabrication machine according to claim 1 wherein said second heat exchanger means raises the temperature of said exhaust gas from said first stage treatment apparatus by at least 25° C.

4. A dual-stage apparatus for treating an exhaust gas from a semiconductor fabrication machine according to claim 1, wherein said absorption unit comprises activated carbon particles.

5. An exhaust gas treatment apparatus comprising:

a first exhaust gas feed pipe having an inlet connected to an exhaust gas source and an outlet for connecting to a condensation unit, said first feed pipe further comprising a first heat exchanger for extracting heat from said exhaust gas and thus decreasing a temperature of said exhaust gas prior to entering the condensation unit, said condensation unit receives an exhaust gas from the first heat exchanger via the first exhaust gas feed pipe and condenses contents in said exhaust gas that have a boiling temperature higher than 150° C., and a second exhaust gas feed pipe having an inlet connected to an outlet on said condensation unit and an outlet connected to an absorption unit, said absorption unit receives a partially-treated exhaust gas from said condensation unit via said second exhaust gas feed pipe and absorbs contents in said partially-treated exhaust gas that have a boiling temperature lower than 150° C., wherein said second feed pipe further comprises a second heat exchanger for heating said partially-treated exhaust gas and increasing a temperature of said partially-treated exhaust gas prior to entering said absorption unit.

6. An exhaust gas treatment apparatus according to claim 5, wherein said absorption unit comprises activated carbon.

7. An exhaust gas treatment apparatus according to claim 5, wherein said condensation unit further comprising a condensed liquid collection tank and a pump means for removing said condensed liquid.

* * * * *